(12) United States Patent
Van Gunter et al.

(10) Patent No.: US 7,039,713 B1
(45) Date of Patent: May 2, 2006

(54) SYSTEM AND METHOD OF USER AUTHENTICATION FOR NETWORK COMMUNICATION THROUGH A POLICY AGENT

(75) Inventors: David Van Gunter, Redmond, WA (US); Lester L. Waters, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/436,135

(22) Filed: Nov. 9, 1999

(51) Int. Cl.
*G06F 15/16* (2006.01)

(52) U.S. Cl. ............ 709/229; 709/238; 709/225; 713/185; 713/153; 713/200; 713/201

(58) Field of Classification Search ........... 713/153, 713/155, 168, 201, 185; 709/224, 225–229, 709/238
See application file for complete search history.

(56) References Cited

U.S. PATENT DOCUMENTS

| | | | | |
|---|---|---|---|---|
| 5,684,951 A | * | 11/1997 | Goldman et al. | 713/202 |
| 5,724,425 A | * | 3/1998 | Chang et al. | 705/52 |
| 5,745,573 A | * | 4/1998 | Lipner et al. | 380/286 |
| 5,757,916 A | * | 5/1998 | MacDoran et al. | 380/258 |
| 6,052,788 A | * | 4/2000 | Wesinger et al. | 713/201 |
| 6,292,892 B1 | * | 9/2001 | Davis | 713/156 |
| 6,311,218 B1 | * | 10/2001 | Jain et al. | 709/229 |
| 6,510,513 B1 | * | 1/2003 | Danieli | 713/516 |
| 6,725,276 B1 | * | 4/2004 | Hardjono et al. | 709/238 |

OTHER PUBLICATIONS

"Applied Cryptography" by Bruce Schneier, 2nd edition.*
K. Egevang & P. Francis, *RFC 1631: The IP Network Address Translator (NAT)*, May 1994, Available from http://www-bib.fh-bielefeld.de/epub/doc/idoc/rfc/rfc1600-1699/rfc1631.html.
M. St. Johns, *RFC 931: Authentication Server*, Jan. 1984, Available from http://www-bib.fh-bielefeld.de/epub/doc/idoc/rfc/rfc0900-0999/rfc931.html.
R. Rivest, *RFC 1321: The MD5 Message Digest Algorithm*, Apr. 1992, Available from http://www-bib.fh-bielefeld.de/epub/doc/idoc/rfc/rfc1300-1399/rfc1321.html.

(Continued)

*Primary Examiner*—David Wiley
*Assistant Examiner*—Kyung H. Shin
(74) *Attorney, Agent, or Firm*—Lee & Hayes, PLLC

(57) ABSTRACT

A policy agent of a network performs an out-of-band user authentication process to verify the identity of a user of a client computer and associates the network data received from the client computer with the user. When the client computer initiates a network data connection to or through the policy agent, the policy agent sends an encrypted challenge to the client computer. The challenge is encrypted with a private key of the policy agent. When the client computer receives the challenge, it decrypts the challenge and prepares a message digest value based on the challenge and the network data sent by the user. The message digest value is then encrypted with the private key of the user to form a response, and the response is sent to the policy agent. The policy agent decrypts the response with the public key of the user to obtain the message digest value and calculates a digest value based on the challenge and the received network data. The policy agent then compares the calculated digest value with the decrypted digest value. A match between the two digest values indicates that the user is successfully authenticated and that the received network data are associated with the user. The policy agent may then apply network policies based on the credentials of the authenticated user.

13 Claims, 5 Drawing Sheets

OTHER PUBLICATIONS

Burton S. Kaliski Jr, *An Overview of the PKCS Standards: An RSA Laboratories Technical Note*, Nov. 1, 1993, Available from http://www.areane.com/doc/rsa/pkcs/overview.htm.

* cited by examiner

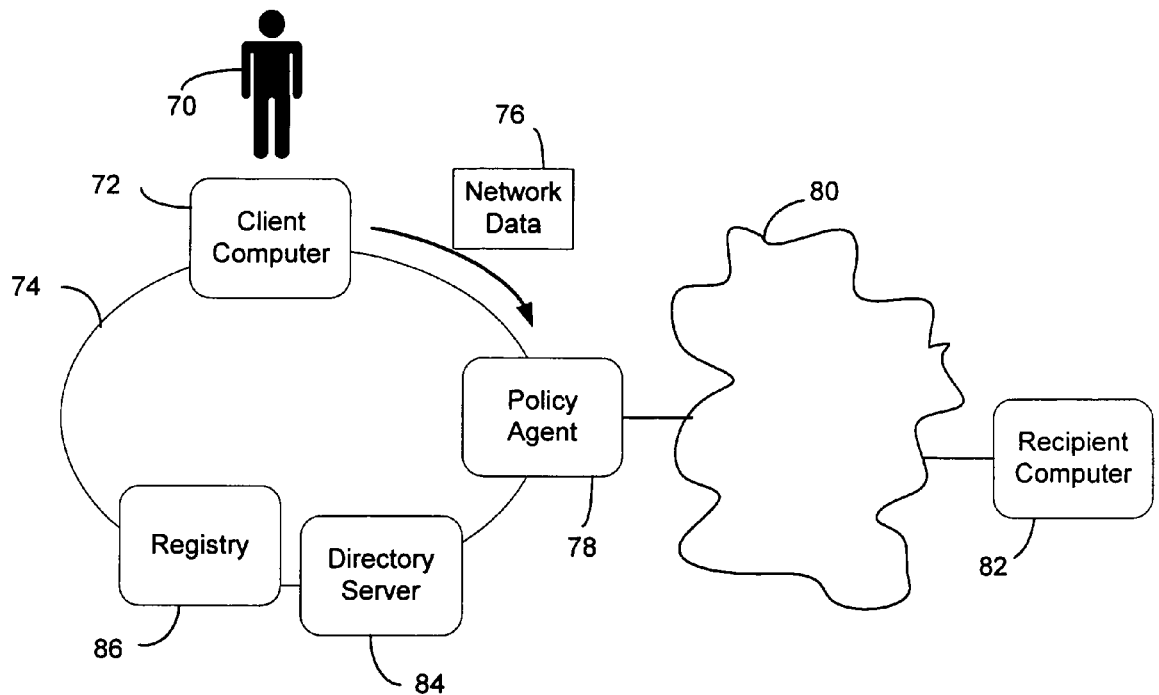
FIG. 2
FIG. 3
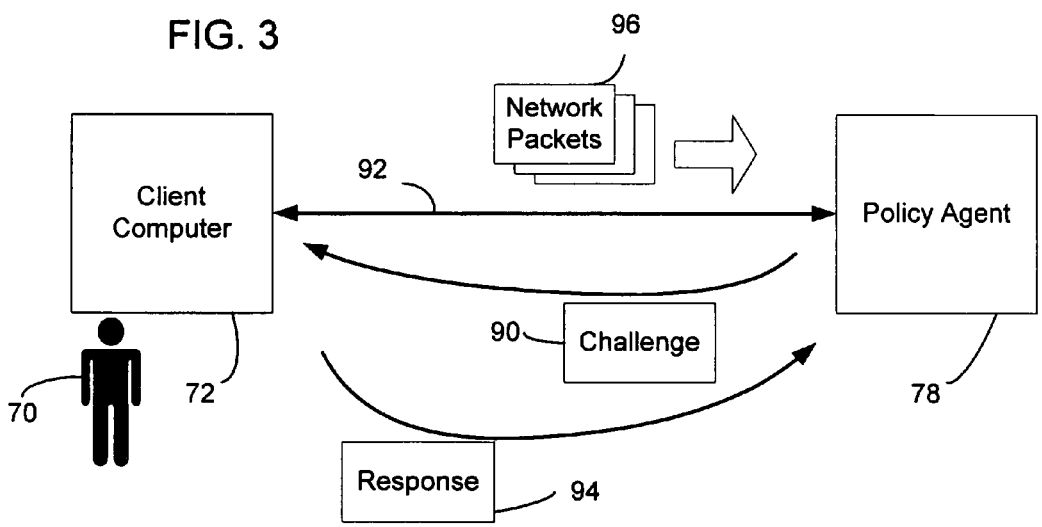

SYSTEM AND METHOD OF USER AUTHENTICATION FOR NETWORK COMMUNICATION THROUGH A POLICY AGENT

TECHNICAL FIELD OF THE INVENTION

This invention relates generally to network communication and, more particularly, to the communication between a computer on a first network with another computer on a second network through a policy agent of the first network.

BACKGROUND OF THE INVENTION

Computers in an organization are often linked together to form a private network so that the computers can communicate with each other and share resources. Such an internal computer network within the control of an organization is commonly referred to as an "intranet." Many intranets are composed of local area networks, although the intranets of some large organizations have grown very large and require the level of sophistication found in the Internet.

Today's network environment demands secure data communications. A major concern for private networks is the possibility of security breach through communications with external networks. As the Internet and the World Wide Web become the essential backbone for worldwide commerce and information sharing, the need for manageable and secure networks becomes more urgent than ever. A fundamental key to the implementation of a secure network is the ability to manage network access. To protect the integrity and vital data of an intranet, a network administrator has to be able to implement policies to restrict access to certain users or sources. The restrictions may be based on various parameters, such as user credentials, the source address, the destination address, time of the day, etc. To that end, a policy agent standing between a private network and an external network, such as the Internet, is typically the focal point for carrying out the network access policies. A policy agent may be, for example, a network firewall that guards the intranet and hides its structure from the outside by filtering communication packets or performing session-based application-level access control.

A successful implementation of access control often requires the capability of applying access policies based on user credentials, i.e., who the user is, whom the user is allowed to send or receive network communication to or from, etc. The commonly used network protocols, however, typically do not lend themselves to user authentication in connection with network access. Network communication data are represented in a variety of network protocols. Each of the existing network protocols serves one or more technical purposes within a network environment. Typically, under those protocols, only the source and destination addresses and ports are provided in the header of the network data, and the access policies are typically limited to those parameters. The lack of user information in the communication packets makes it very difficult to implement network policies based on user credentials. It is possible, of course, to create a new network protocol that includes information for user authentication in the data stream. Such a solution, however, may not be preferred, as it will require almost all existing network applications to be rewritten to accommodate the new protocol.

SUMMARY OF THE INVENTION

In view of the foregoing, the present invention provides a method and system for a policy agent of a network to authenticate a user that uses a client computer on the network to transmit network communication data and to associate the data stream from the client computer with the user. When the client computer initiates a network data connection to or through the policy agent, the policy agent detects the data connection and sends a challenge to the client computer. The challenge is encrypted with a private key of the policy agent. When the client computer receives the challenge, it decrypts the challenge with the public key of the policy agent and prepares a message digest value, such as by a hash algorithm, based on the data in the challenge and the network data sent by the user. The message digest value is then encrypted with the private key of the user and sent to the policy agent. The policy agent decrypts the received response with the public key of the user to obtain the message digest value. The policy agent then calculates a digest value based on the challenge and the network data received from the client computer and compares the calculated digest value with the digest value decrypted from the response. If the two digest values match, the policy agent knows that the user has been authenticated and that the received network data are those sent by the user. The policy agent may then apply network policies based on the credentials of the authenticated user.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2 is a schematic diagram showing a client computer on a network transmitting network data through a policy agent of the network;

FIG. 3 is a schematic diagram illustrating communications between the policy agent and the client computer for a user authentication process;

DETAILED DESCRIPTION OF THE INVENTION

Figure 1:
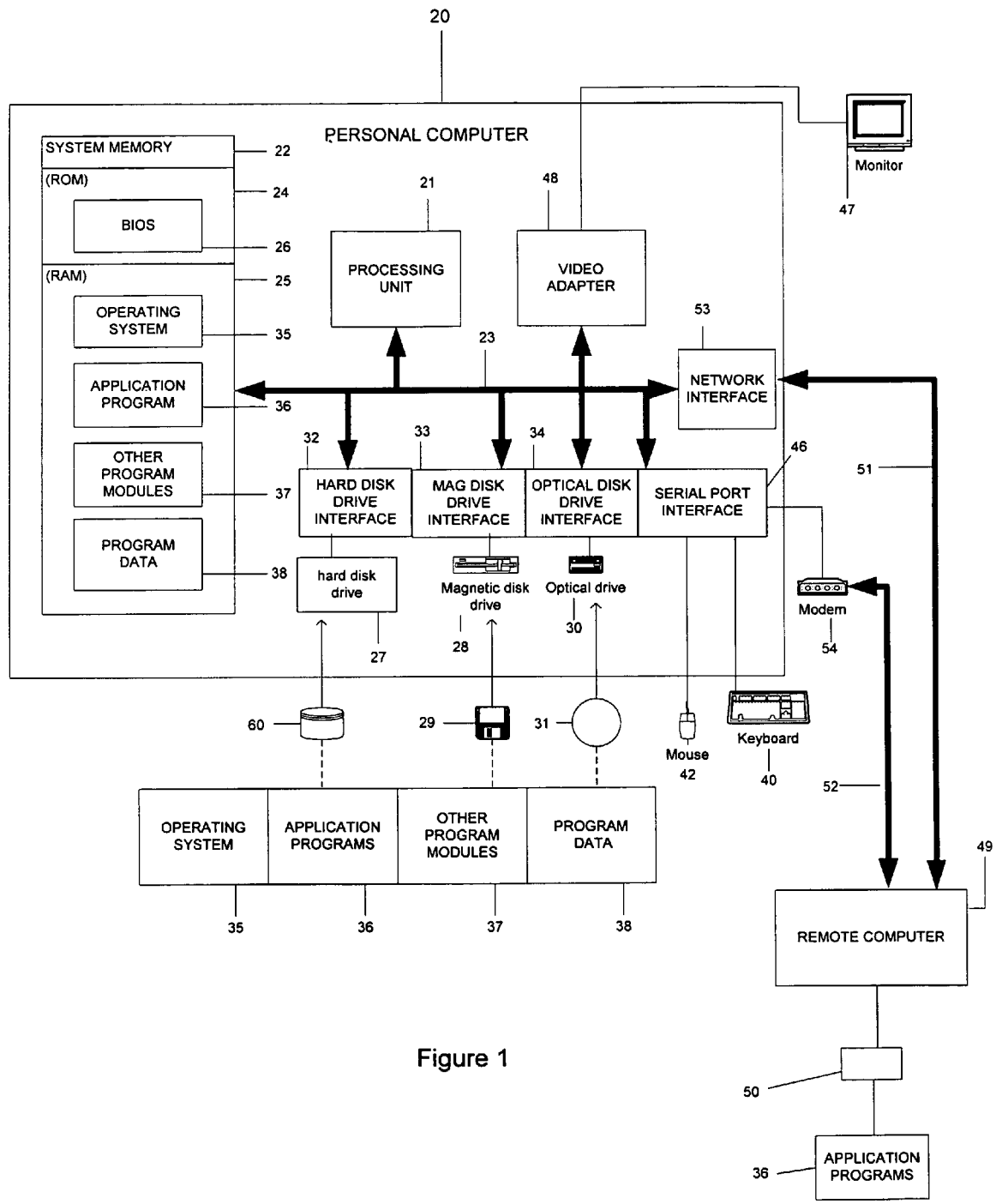
FIG. 1 is a block diagram generally illustrating an exemplary computer system on which the present invention resides.

Turning to the drawings, wherein like reference numerals refer to like elements, the invention is illustrated as being implemented in a suitable computing environment.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Referring now to FIG. 2, the present invention is directed to a system and method of authenticating a user 70 that uses a client computer 72 on a network 74 to send a network data stream 76 through a policy agent 78 of the network. As shown in FIG. 2, the policy agent 78 is the connection point, or gateway, between the network 74 of the client computer and another network 80 on which the recipient computer 82 resides. The policy agent may be, for example, a network firewall. In a preferred embodiment, the first network 74 on which the client computer 72 resides is an intranet, and the second network 80 is an external network, such as the Internet. When the user 70 uses the client computer 72 to send network data to the recipient computer 82 on the external network, the network data is directed to the policy agent 78, which applies access policies to determine whether to pass the network data to or from the recipient computer.

In accordance with a feature of the invention, the policy agent 78 carries out a user-authentication process that authenticates the user 70 who sends the network data 76 and associates the network data received from the client computer with the authenticated user. In other words, the policy agent 78 verifies that user 70 is indeed who she claims to be, and verifies that the received network data are indeed those sent by that user. The user authentication enables the policy agent to apply access policies based on the credentials of the user. As will be described in greater detail below, the user authentication according to the invention is secure from malicious alterations, such as by a man-in-the-middle attack, user credential spoofing, or a reply attack.

Moreover, the authentication process is independent of the particular network protocol used for transmitting the network data. In accordance with a feature of the invention, the user authentication is performed out-of-band, i.e., the network communications for the authentication process are not part of network data stream on which the network policies are to be applied. Few network protocols commonly used for network data transmission have provisions for inclusion of user authentication information as part of the data stream. If an in-band user authentication is to be implemented, those network protocols would have to be substantially modified or entirely replaced with new protocols. Such a solution, however, may not be practical or desirable. The out-of-band user authentication in accordance with the invention avoids the need to include user authentication information in the network data stream on which access policies are to be applied. As a result, the authentication process is independent of the underlying network protocol used to send the data stream and can be used with existing network protocols. With out-of-band user authentication, however, there is a risk that the user information may be altered or incorrectly associated with the network data stream. As will be described in greater detail below, user authentication according to the invention effectively avoids this risk by including data from the network data stream in the digital signature process used in the user authentication.

Turning now to FIG. 3, the user authentication process includes the sending of a challenge 90 by the policy agent 78 to the client computer 72 that initiated the network connection 92, and the returning of a response 94 by the client computer to the policy agent. This challenge-response sequence employs a public key/private key encryption scheme for authenticating the identity of the user. The response 94 also includes information regarding the network data to enable the policy agent to confirm that the received network data are those sent by the user. In a preferred embodiment, the network data are in the form of data packets 96.

Figure 4:
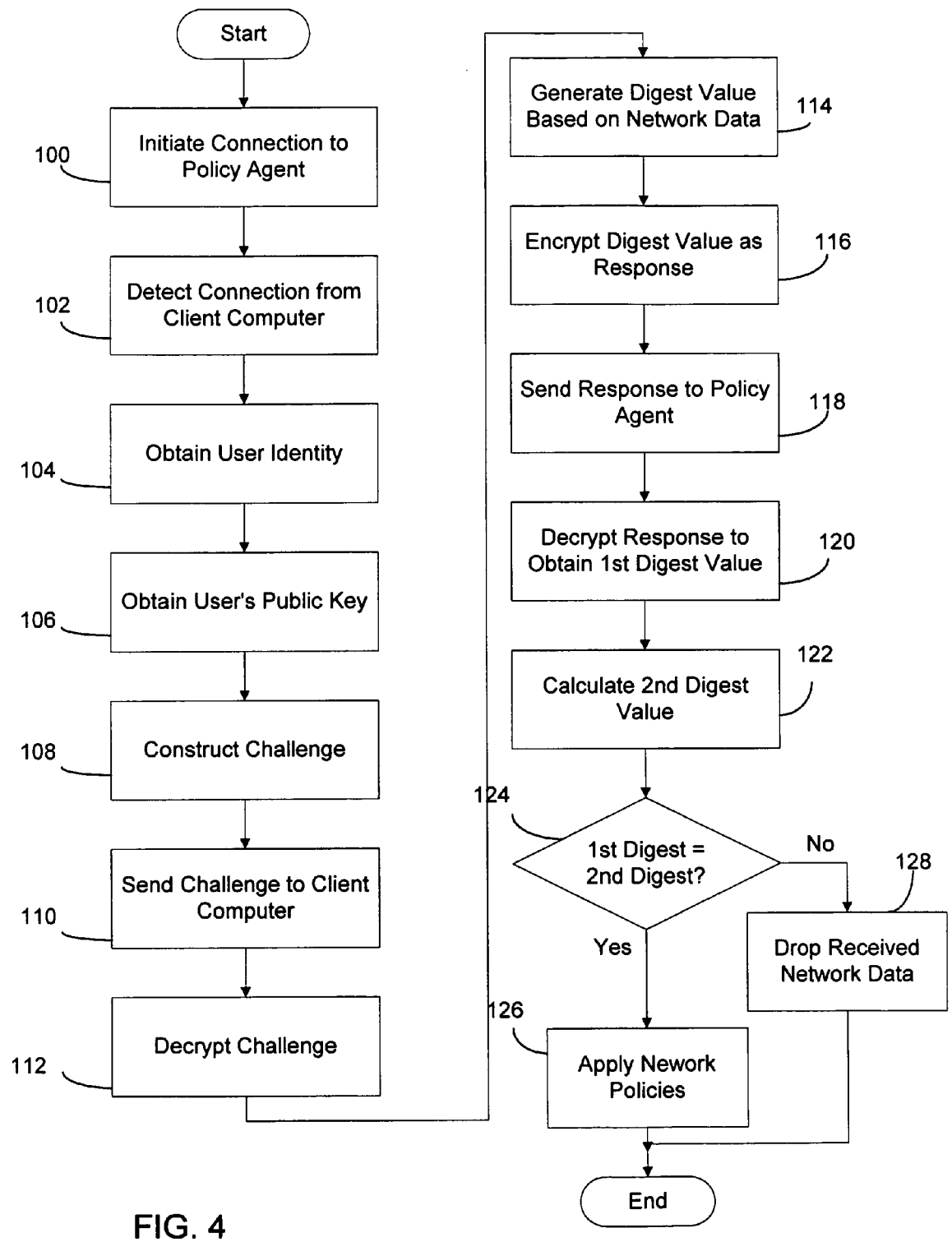
FIG. 4 is a flow chart showing an embodiment of the user authentication process for network data transmitted through the policy agent.

An embodiment of the authentication process is illustrated in FIG. 4. When the client computer located on the network initiates a network data connection either to or through the policy agent (step 100), the out-of-band authentication process is initiated. When the policy agent detects the new network connection (step 102), it obtains the purported identity of the user (step 104). Various ways can be used to obtain the identity of the user associated with the network connection with the client computer. For example, in a preferred embodiment, the source information in the network data may include the address and port number of the client computer that sent the data. A query may be sent to a directory service 84 (FIG. 2) that keeps track of the current configuration and usage of the computers on the network. In response, the directory service 84 returns the identity of the user currently at the source address and port number. It will be appreciated that the invention is not limited to any specific mechanism used for obtaining the identity of the unauthenticated user associated with the network connection.

After the policy agent has obtained the purported identity of the user associated with the network connection, it obtains a public key of the user (step 106). This may be done, for example, by querying a registry 86 (FIG. 2) that maintains a file of public keys of users registered with it. The registry 86 may be separate or the same as the directory server 84. The policy agent then constructs a challenge 90 that is encrypted with its own private key (step 108). The challenge 90 is sent to the client computer 72 (step 110).

When the client computer 72 receives the challenge 90, it decrypts the challenge using the policy agent's public key (step 112). The client computer then generates a first message digest value based on the data from the decrypted challenge and the network data transmitted to the policy agent (STEP 114). The first message digest value is encrypted with the private key of the user to form a response to the challenge (step 116), and the response is sent to the policy agent (step 118). When the policy agent receives the response, it decrypts the response with the public key of the user to obtain the first message digest value (step 120). It then calculates a second message digest value from the challenge and the network data it received from the client computer (step 122). The policy agent then compares the digest value it calculated with the digest value decrypted from the response (step 124). An agreement between these two digest values indicates that the user is indeed who she claims to be, and that the data received are those sent out by that user.

It is to be noted that it is not necessary for the policy agent to have received the data packets from the user when it constructs the challenge. The policy agent, however, can calculate the second digest value (step 122, FIG. 4) only after having received the data packets. If the policy agent receives the data packets from the client computer prior to calculating the challenge or before the user is authenticated, it should buffer the data and not forward them to their destination until the authentication process has been completed.

Once the user is successfully authenticated, the policy agent can apply network access policies on the received network data based on the credentials of the user (step 126). On the other hand, if the two digest values do not match, the user authentication has failed. Either the user is not who she claims to be, or the received network data have been tampered with. In that case, the policy agent may drop the received network data (step 128), i.e., not to forward them to the specified recipient, and may perform other security measures, such as logging the event.

Figure 5:
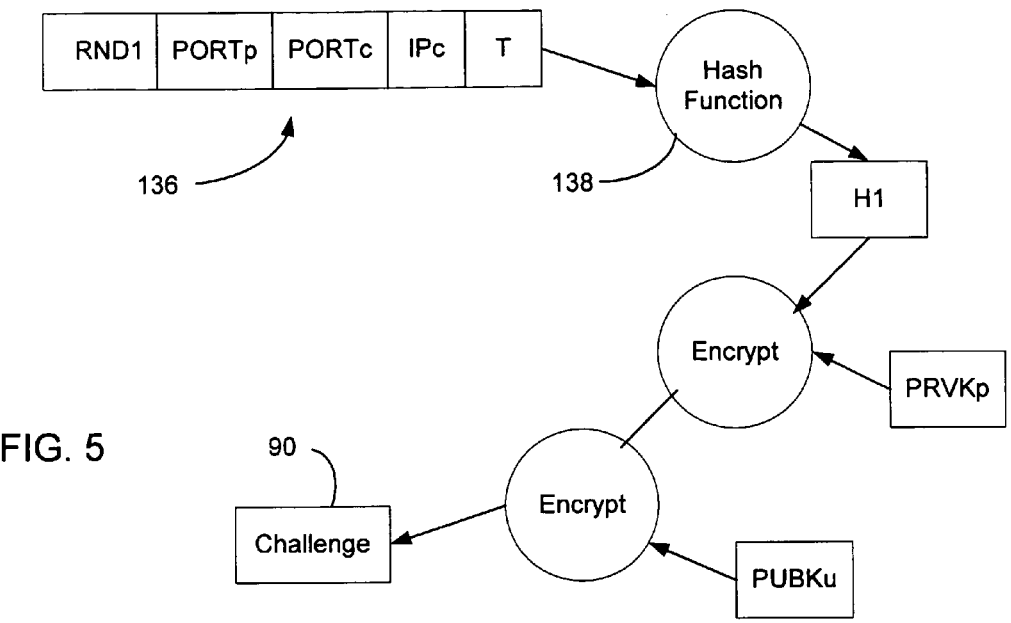
FIG. 5 is a schematic diagram illustrating the generation of a challenge sent by the policy agent to the client computer for user authentication.

By way of example, the construction of the challenge and response in a preferred embodiment is described below. Referring now to FIG. 5, in this embodiment, the underlying protocol for the transmission of network data is the widely used TCP/IP. Each of the client computer and the policy agent is identified by an IP address, and the network connection between them is further identified by a port number of the client computer and a port number of the policy agent. The network data sent by the user at the client computer are transmitted in the form of communication packets 96 (FIG. 3). When the policy agent 78 detects the network connection from client computer 72, it obtains the name of the unauthenticated user who purportedly used the client computer to initiate the connection. The policy agent then proceeds to look up the public key PUBKu of the user of the client computer. The policy agent knows its own public key PUBKp and private key PRVKp. In addition to the user's public key PUBKu, the policy agent obtains the following information from the operating system:

IPc—the IP address of the client computer;
PORTc—the IP connection port of the client computer;
PORTp—the IP connection port of the policy agent;
T—the system time;
RND1—a random number.

The policy agent then constructs a challenge for user authentication based on these five values. As illustrated in FIG. 5, these five values are concatenated, and the resultant value 136 is used as the input of a hash function 138 to generate a hash value H1. The hash function 138 may be, for example, the MD5 algorithm known to those skilled in the art. This step of generating the hash value is represented by the following expression:

$$H1=MD5(RND1*PORTp*PORTc*IPc*T),$$

where the symbol "*" means concatenation. The hash value H1 is then encrypted first with the private key PRVKp of the policy agent and then with the public key PUBKu of the purported user to form the challenge 90. This step is represented by the following expression:

$$C=PUBKu(PRVKp(H1)),$$

wherein C is the challenge. The challenge 90 is sent by the policy agent 78 to the client computer 72.

Figure 6:
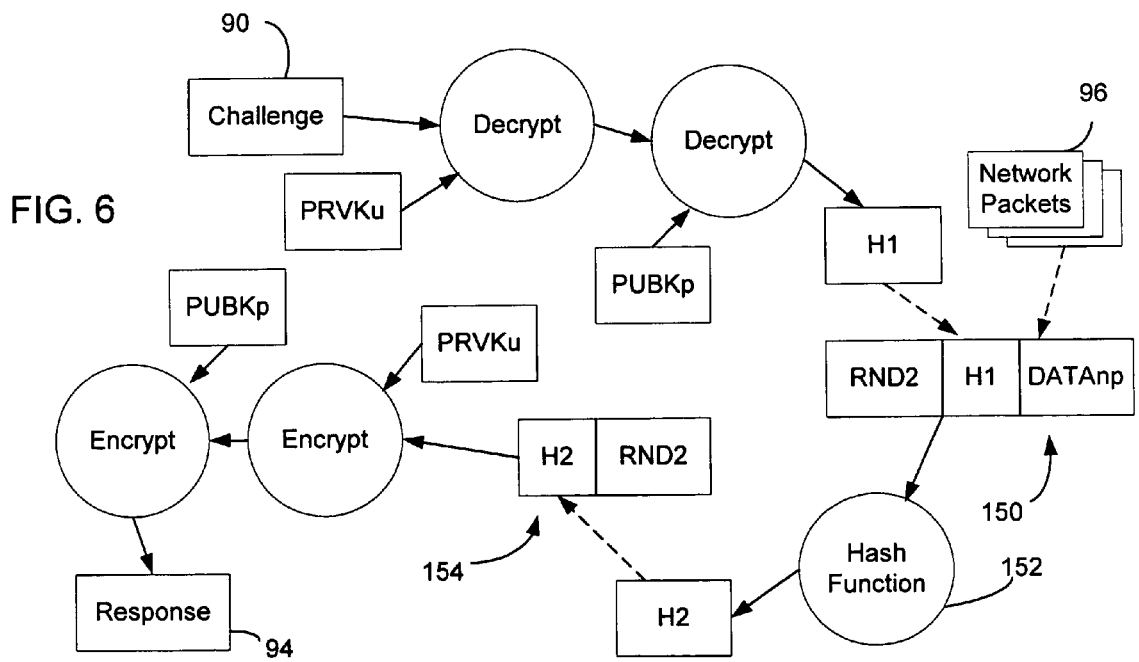
FIG. 6 is a schematic diagram illustrating the generation of a response by the client computer.

As shown in FIG. 6, when the client computer 72 that initiated the connection receives the challenge 90, it decrypts the challenge 90 using the user's private key PRVKu and the policy agent's public key PUBKp. If the public key PUBKu used to encrypt the challenge 90 indeed belongs to the user, the client computer would be able to decrypt the challenge to obtain the hash number H1. The client computer then constructs a response 94 that ties the user authentication to the network data stream. To prepare the response 94, the client computer concatenates a random number RND2, the decrypted hash H1, and data DATAnp from the first N packets of the transmitted network data, where N is a pre-selected number, such as five (5). The concatenated value 150 is then used as the input for a hash function 152, such as the MD5 algorithm, to generate a second hash value H2. This step is represented by the following expression:

$$H2=MD5(RND2*H1*DATAnp).$$

The hash value H2 is then concatenated with the random number RDN2, and the concatenated value 154 is encrypted first with the user's private key PRVKu and then with the public key PUBKp of the policy agent to form the response 94. This step is represented by the following expression:

$$R=PUBKp(PRVKu(H2*RND2),$$

where R is the response. The response 94 is then sent to the policy agent 78.

Figure 7:
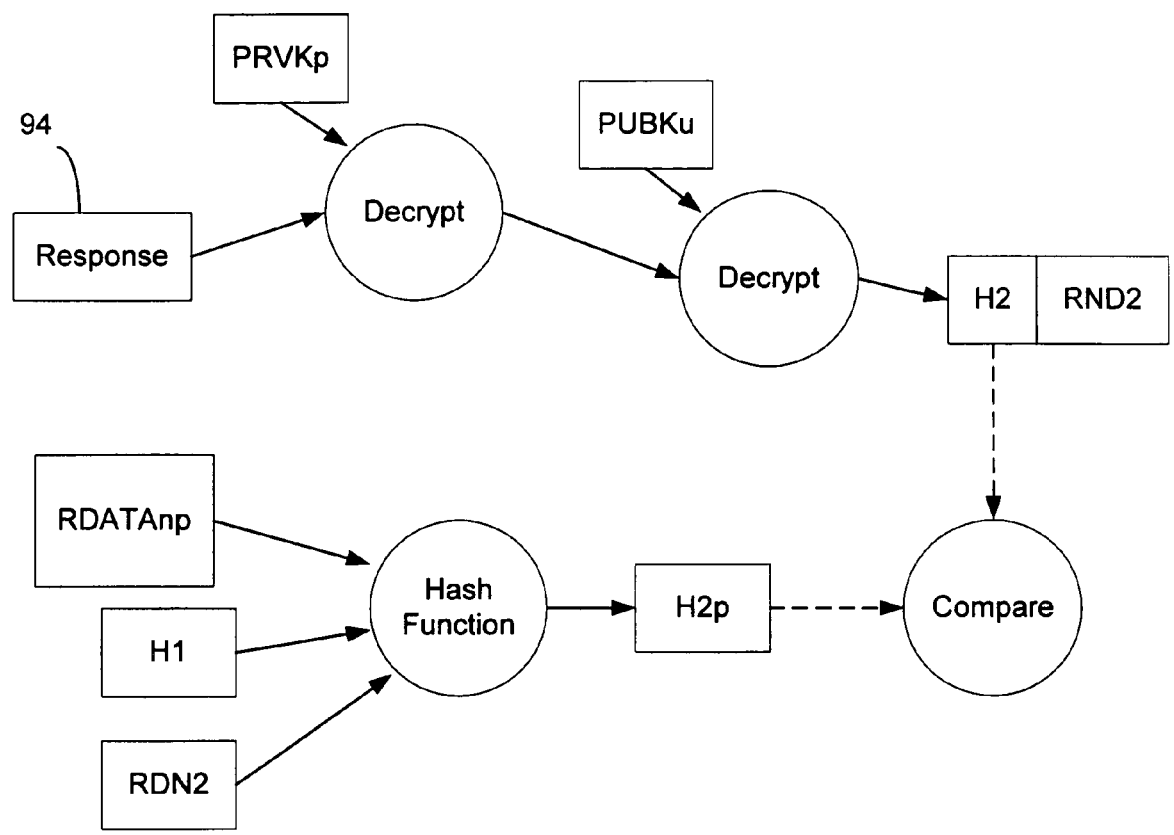
FIG. 7 is a schematic diagram illustrating the use of the response for authenticating the user and associating the received network data to the user.

Turning now to FIG. 7, when the policy agent 78 receives the response 94 from the client computer, it decrypts the response using its own private key PRVKp and the public key PUBKu of the user to obtain the hash H2 and the random number RDN2. To verify that the hash number H2 from the decrypted response is what it should be, the policy agent calculates a hash value H2p using the hash value H1 included in the challenge 90, the random number RND2 from the decrypted response 94, and the data RDATAnp of the first N packets of the received network data as the input for the hash function. An agreement between the hash value H2p calculated by the policy agent and the hash value H2 decrypted from the response 94 indicates that the user is who she claims to be, and that the network data received by the policy agent from the client computer are indeed those sent by the user. In other words, the validation of the response serves two functions: authenticating the user and associating the received network with the authenticated user. The user is authenticated because only the real user would have the private key to properly decrypt the challenge and construct a valid response. The network data are confirmed to be those sent by the user because if the data packets received by the policy agent have been maliciously altered, the hash value H2p calculated by the policy agent would be different from the hash value H2 obtained from the response. In addition to the user authentication and data stream association, the hash value H2 can now be used as a one-time shared secret for further session encryption.

In the embodiment described above, the public keys PUBKp and PUBKu of the policy agent and the user, respectively, are used for encryption in the challenge-response process. In another embodiment, to speed up the process, the policy agent can opt not encrypt the challenge with the public key PUBKu of the user, and the client computer will also not encrypt the response with the public key PUBKp of the policy agent. This process saves two public-key encryption steps and the corresponding private-key decryption steps. In this case, however, the hash value H2 may be obtained by a malicious attacker by intercepting the response and decrypting it with the public key PUBKu of the user. As a result, the hash H2 is preferably not used as a shared secret for further encryption.

In view of the foregoing, it can be seen that the present invention provides an effective method and system for a policy agent to authenticate a user that sends a network data stream. The authentication process is performed out-of-band and is thus independent of the protocols used to transmit the network data. The authentication process according to the invention not only verifies the identity of the user sending the network packets but also associates the network data stream received by the policy agent with the user being authenticated.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for operating a policy agent of a network for performing steps comprising:
   detecting a network connection from a client computer on the network;
   composing a challenge for authenticating a user of the client computer associated with said network connection, the challenge being encrypted with a private key of the policy agent;

transmitting the challenge to the client computer;
receiving a response from the client computer;
decrypting the response using a public key of the user to obtain a first message digest value;
receiving network data in a form of packets, through the network connection with the client computer;
calculating a second message digest value based on the challenge and a pre-selected number of packets of the received network data;
comparing the first and second message digest values to determine whether a match is found;
if a match is found, then forwarding the network data to their specified recipient, else not forwarding the network data to their specified recipient.

2. A computer-readable medium as in claim 1, wherein the policy agent is a firewall.

3. A computer-readable medium as in claim 1, wherein the step of composing includes encrypting the challenge with a public key of the user.

4. A computer-readable medium as in claim 3, wherein the step of decrypting includes decrypting the response with a private key of the policy agent.

5. A computer-readable medium as in claim 1, wherein the step of composing includes generating a third digest value from data including a time value, and encrypting the third digest value with the private key of the policy agent.

6. A computer-readable medium as in claim 1, having further computer-executable instructions for performing network access policies on the received network data according to the identify of the user after a match between the first and second message digest values is found.

7. A method of authenticating a user using a client computer on a network to transmit network data through a policy agent of the network, comprising the steps of:
detecting by the policy agent a network connection from the client computer for transmitting network data of the user;
receiving by the policy agent network data in a form of packets, transmitted through the network connection from the client computer;
obtaining, by the policy agent, an identity of the user and a public key of the user;
composing, by the policy agent, a challenge encrypted with a private key of the policy agent;
sending the challenge to the client computer;
decrypting, by the client computer, the challenge;
generating, by the client computer, a first message digest value based on the challenge and a pre-selected number of packets of the network data of the user;
encrypting, by the client computer, the first message digest value with a private key of the user to create a response;
sending the response to the policy agent;
decrypting, by the policy agent, the response to obtain the first message digest value;
calculating a second message digest value based on the challenge and the network data received through network connections from the client computer;
comparing the first and second message digest values to determine whether there is a match there between, and
if a match is found, then forwarding, by the policy agent, the network data to their specified recipient, else not forwarding the network data to their specified recipient.

8. A method as in claim 7, further including the step of applying network policies by the policy agent on the received network data based on the identity of the user after a match between the first and second message digest values is found.

9. A method as in claim 7, wherein the step of composing the challenge includes encrypting the challenge with the public key of the user.

10. A method as recited in claim 7, wherein the step of encrypting by the client computer includes encrypting the first message digest value with a public key of the policy agent.

11. A method as in claim 7, wherein the step of composing the challenge includes generating a third message digest value based on data including a time value and encrypting the third message digest value to form the challenge.

12. A method as in claim 7, wherein the step of generating by the client computer generates the first message digest value based on a random number, data decrypted from the challenge, and data of the pre-selected packets of the received network data.

13. A method as in claim 7, wherein the policy agent is a firewall of the network.

* * * * *